United States Patent [19]

Matsuda et al.

[11] Patent Number: 5,140,817
[45] Date of Patent: Aug. 25, 1992

[54] SUPERCHARGING PRESSURE CONTROL SYSTEM FOR ENGINE WITH TURBOCHARGERS

[75] Inventors: Ikuo Matsuda; Seiji Tashima; Ikuo Onimura; Akihiro Nakamoto, all of Hiroshima, Japan

[73] Assignee: Mazda Motor Corporation, Hiroshima, Japan

[21] Appl. No.: 575,441

[22] Filed: Aug. 30, 1990

[30] Foreign Application Priority Data

Sep. 1, 1989 [JP] Japan .................. 1-228105

[51] Int. Cl.⁵ .............................................. F02B 37/12
[52] U.S. Cl. ........................................ 60/612; 60/602
[58] Field of Search ............... 60/600, 601, 602, 603, 60/612

[56] References Cited

U.S. PATENT DOCUMENTS

| | | | |
|---|---|---|---|
| 4,254,625 | 3/1981 | Bergstedt et al. | 60/602 |
| 4,459,809 | 7/1984 | Tadokoro et al. | 60/602 |
| 4,793,140 | 12/1988 | Esch | 60/600 |
| 5,005,359 | 4/1991 | Tashima et al. | 60/612 X |

FOREIGN PATENT DOCUMENTS 41417 4/1981 Japan .
160022 9/1984 Japan .

*Primary Examiner*—Michael Koczo
*Attorney, Agent, or Firm*—Sixbey, Friedman, Leedom & Ferguson

[57] ABSTRACT

An engine is provided with primary and secondary turbochargers. In a small intake air mass range, only the primary turbocharger is caused to operate, and in a large intake air mass range, both the primary and secondary turbochargers are caused to operate. A waste gate valve and an exhaust bypass valve are controlled so that the supercharging pressure approximates to a target supercharging pressure. The target supercharging pressure in the large intake air mass range is set lower than that in the small intake air mass range.

13 Claims, 8 Drawing Sheets

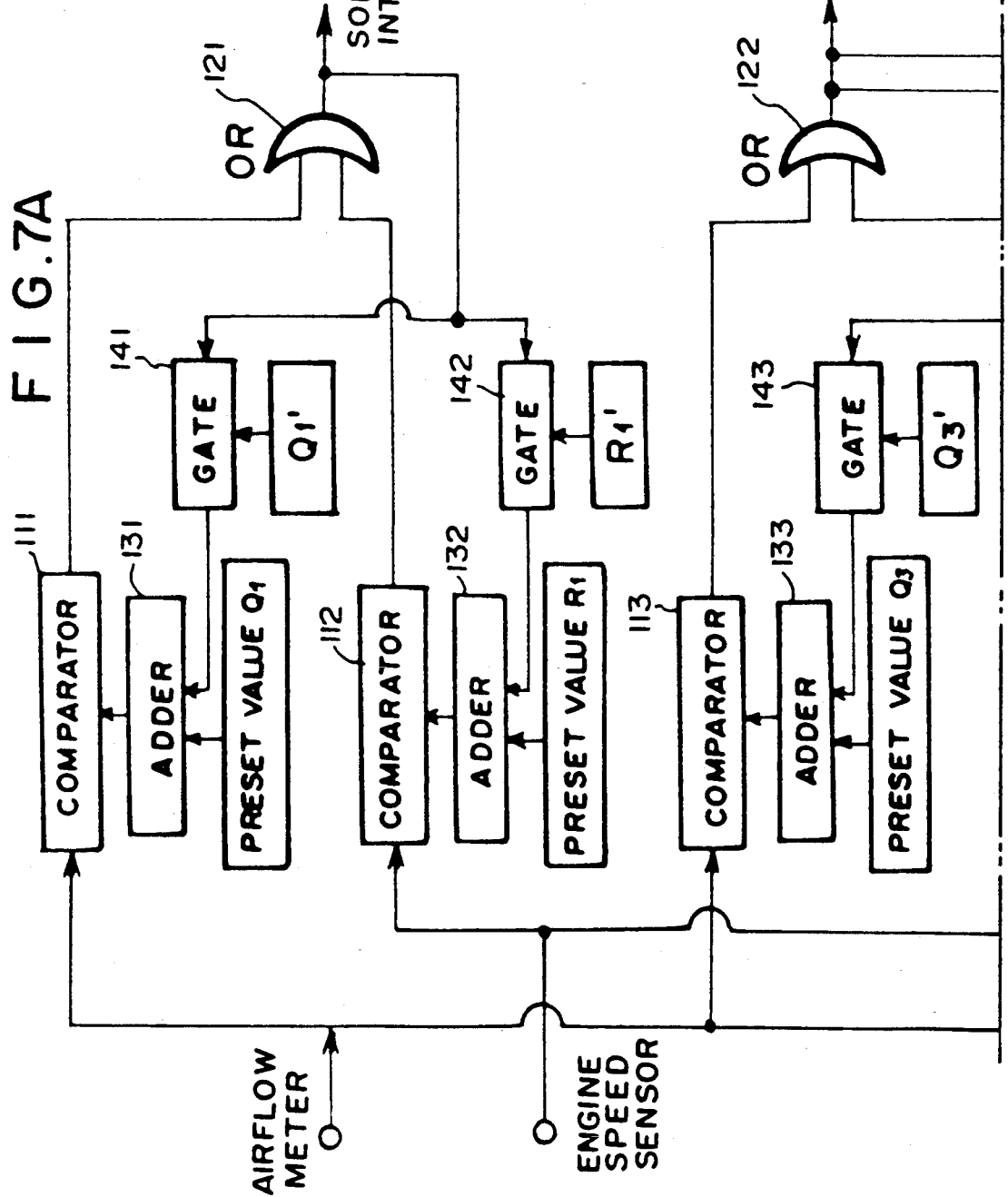

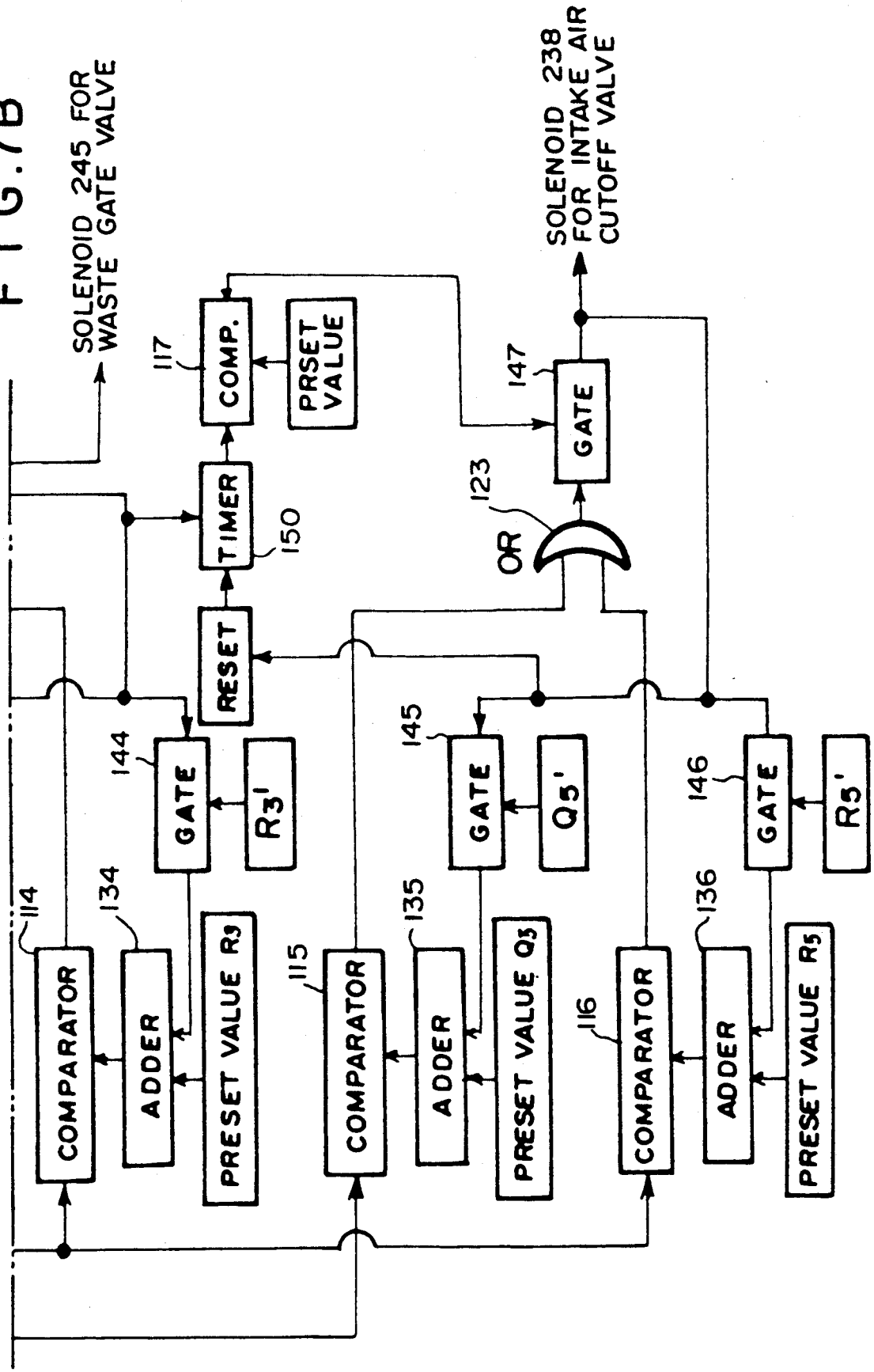

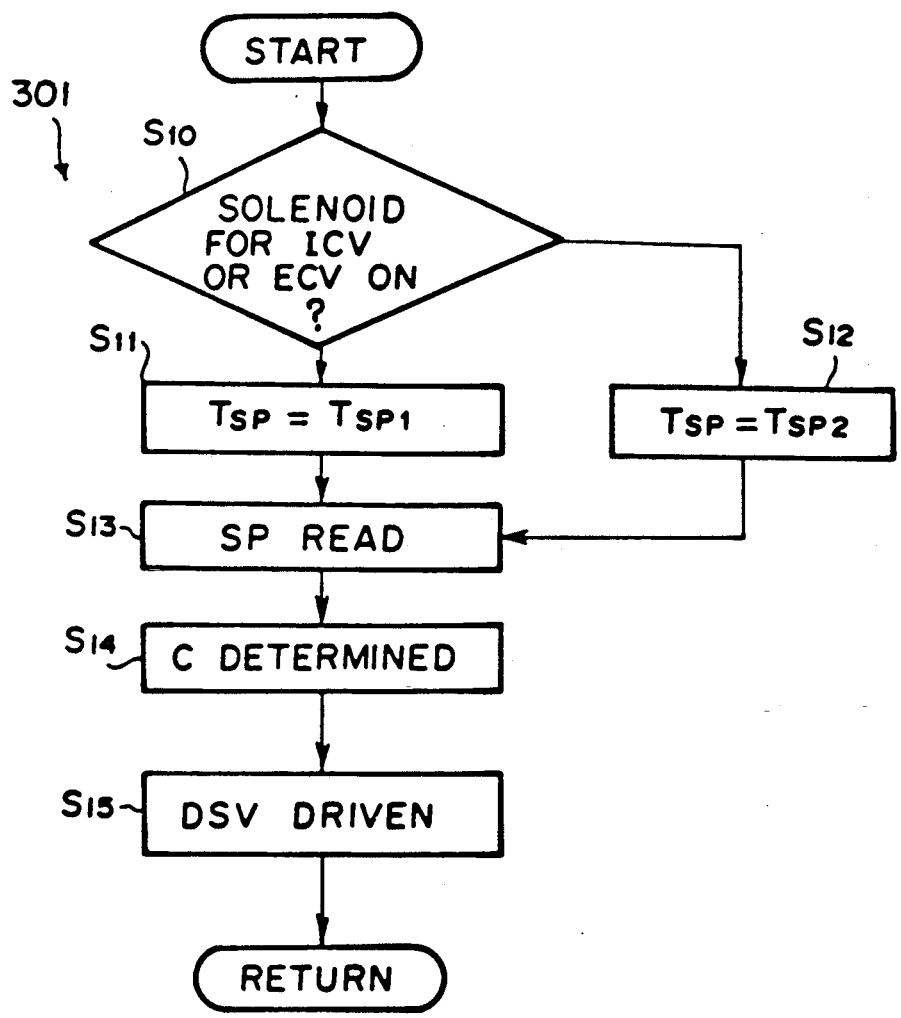

SUPERCHARGING PRESSURE CONTROL SYSTEM FOR ENGINE WITH TURBOCHARGERS

BACKGROUND OF THE INVENTION

1. Field of the Invention

This invention relates to a supercharging pressure control system for an engine which is provided with primary and secondary turbochargers and in which the secondary turbocharger is selectively made operative or inoperative according to the intake air mass flow.

2. Description of the Prior Art

As disclosed, for instance, in Japanese Unexamined Utility Model No. 60(1985)-178329, there has been known an engine which is provided with a pair of turbochargers, a primary turbocharger and a secondary turbocharger. In the engine, the turbines of the turbochargers are disposed in parallel in an exhaust passage and the blowers of the turbochargers are connected to an intake passage of the engine. An exhaust cutoff valve is provided in the exhaust passage upstream of the turbine of the secondary turbocharger and is closed in a small intake air mass range where the intake air mass flow is smaller than a preset value, thereby making inoperative the secondary turbocharger and concentrating exhaust gas from the exhaust passage to the turbine of the primary turbocharger in order to ensure a high supercharging pressure. On the other hand, in a large intake air mass range where the intake air mass flow is larger than a preset value, the exhaust cutoff valve is opened so that exhaust gas from the exhaust passage is fed to the turbines of both the turbochargers thereby causing the secondary turbocharger to operate together with the primary turbocharger and obtaining a proper supercharging pressure. The engine provided with such turbochargers is generally referred to as a "sequential-turbocharger engine".

In such a sequential-turbocharger engine, when the intake air mass flow increases near the present value in the small intake air mass range where only the primary turbocharger is operated, the exhaust pressure upstream of the turbines of the turbochargers increases. This is mainly because the flow resistance of the turbine of the primary turbocharger increases since exhaust gas is collectively fed to the turbine of the primary turbocharger, and because the efficiency of the primary turbocharger deteriorates as the intake air mass flow increases. When the exhaust pressure upstream of the turbines of the turbochargers increases, pumping loss of the engine during the exhaust stroke increases and at the same time, the charging capacity during the intake stroke deteriorates, whereby the engine output torque lowers. Accordingly, when the intake air mass flow increases and the operating condition of the engine shifts from the small intake air mass range to the large intake air mass range where both the primary turbocharger and the secondary turbocharger operate, as during acceleration, the secondary turbocharger begins to operate and exhaust gas is shared to both the turbochargers. This causes the flow resistance to abruptly lower, the efficiency of the turbocharger to abruptly improve and the exhaust pressure upstream of the turbines of the turbochargers to lower, whereby the engine output torque abruptly increases and torque shock occurs.

SUMMARY OF THE INVENTION

In view of the foregoing observations and description, the primary object of the present invention is to provide a supercharging pressure control system for a sequential-turbocharger engine which can suppress the torque shock which is apt to occur during shift of the operating condition of the engine.

In accordance with the present invention, the target supercharging pressure in the large intake air mass range is set lower than that in the small intake air mass range so that the engine output torque is reduced.

That is, in accordance with the present invention, there is provided a supercharging pressure control system for an engine provided with a primary turbocharger and a secondary turbocharger, the primary turbocharger and the secondary turbocharger having blowers disposed in the intake passage of the engine in parallel to each other and turbines disposed in the exhaust passage of the engine in parallel to each other, only the primary turbocharger being caused to operate in a small intake air mass range and both the primary and secondary turbochargers being caused to operate in a large intake air mass range, said supercharging pressure control system comprising a supercharging pressure regulating means which regulates the supercharging pressure, a supercharging pressure detecting means which detects the supercharging pressure and a supercharging pressure control means which receives an output of the supercharging pressure detecting means and controls the supercharging pressure regulating means so that the supercharging pressure approximates to a target supercharging pressure, the target supercharging pressure being set lower in the large intake air mass range than in the small intake air mass range.

In the supercharging pressure control system in accordance with the present invention, since the target supercharging pressure is set lower in the large intake air mass range than in the small intake air mass range, when the operating condition of the engine shifts into the large intake air mass range from the small intake air mass range and the secondary turbocharger begins to operate, which results in reduction of the exhaust pressure upstream of the turbines, the target supercharging pressure is lowered and an abrupt increase of the engine output torque is prevented, whereby torque shock is suppressed.

Further when the operating condition of the engine shifts into the small intake air mass range from the large intake air mass range and the secondary turbocharger is made inoperative, which results in increase of the exhaust pressure upstream of the turbines, the target supercharging pressure is increased and an abrupt drop of the engine output torque is prevented, whereby torque shock is suppressed.

BRIEF DESCRIPTION OF THE DRAWINGS

FIG. 7 is a circuit diagram of the control unit, and FIG. 8 is a flow chart showing another example of the control of the supercharging pressure which the control unit executes.

DESCRIPTION OF THE PREFERRED EMBODIMENT

Figure 1:
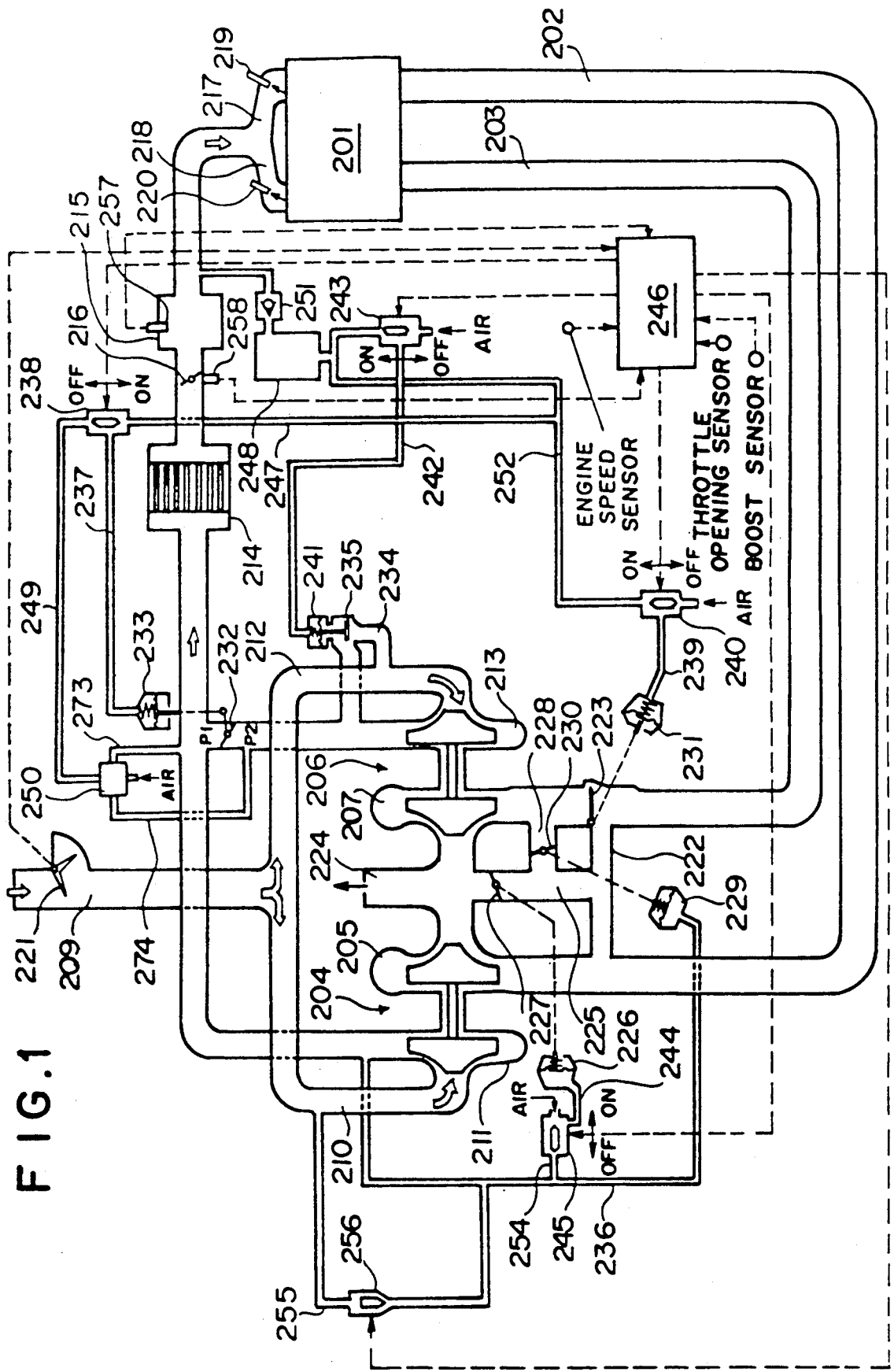
FIG. 1 is a schematic view showing an engine provided with a supercharging pressure control system in accordance with an embodiment of the present invention.

In FIG. 1, a two-rotor rotary engine 201 has a pair of exhaust passages 202 and 203, one for each cylinder, which are separated from each other. In the exhaust passage 202 is disposed a turbine 205 of a primary turbocharger 204, and in the exhaust passage 203 is disposed a turbine 207 of a secondary turbocharger 206. That is, by separately leading the exhaust passages 202 and 203 for the respective cylinders to the turbines 205 and 207 of the primary and secondary turbochargers 204 and 206, the dynamic pressure of exhaust gas is caused to effectively act on the turbines 205 and 207 of the primary and secondary turbochargers 204 and 206 in the operating range of the engine 201 where both the turbochargers 204 and 206 are to operate, whereby the supercharging efficiency is improved. The exhaust passages 202 and 203 merge together into a common exhaust passage 224.

A common intake passage 209 branches into first and second branch intake passages 210 and 212 at a portion downstream of an air cleaner (not shown), and blowers 211 and 213 of the primary and secondary turbochargers 204 and 206 are respectively disposed in the first and second branch intake passages 210 and 212. The first and second branch intake passages 210 and 212 extend substantially in right opposite directions at their upstream end portions and merges together into the downstream portion of the common intake passage 209 at their downstream end portions. An intercooler 214, a throttle valve 216 and a surge tank 215 are disposed in the downstream portion of the common intake passage 209 with the inner cooler 214 being upstream of the throttle valve 216 which is upstream of the surge tank 215. Further the downstream portion of the common intake passage 209 branches into a pair of discrete intake passages 217 and 218 at the downstream end portion. The discrete intake passages 217 and 218 are connected to intake ports (not shown) of the respective cylinders. Fuel injection valves 219 and 220 are respectively disposed in the discrete intake passages 217 and 218.

An airflow meter 221 is provided in the upstream portion of the common intake passage 209, and the surge tank 215 is provided with a supercharging pressure sensor 257 which detects the supercharging pressure.

The exhaust passages 202 and 203 communicates with each other by way of a communicating passage 222 relatively small in cross-section at a portion upstream of the primary and secondary turbochargers 204 and 205. An exhaust cutoff valve 223 is disposed in the exhaust passage 203, in which the turbine 207 of the secondary turbocharger 205, at a portion immediately downstream of the portion at which the communicating passage 22 opens.

A waste gate passage 225 extends from an intermediate portion of the communicating passage 222 to the common exhaust passage 224 and is provided with a waste gate valve 227 which is driven by a diaphragm type actuator 226.

An exhaust bypass passage 228 communicates the portion of the waste gate passage 225 upstream of the waste gate valve 227 with the portion of the exhaust passage 203 downstream of the exhaust cutoff valve 223, and is provided with an exhaust bypass valve 230 which is driven by a diaphragm type actuator 229.

The exhaust cutoff valve 223 is driven by a diaphragm type actuator 231. An intake air cutoff valve 32 is disposed in the second branch intake passage 212 downstream of the blower 213 of the secondary turbocharger 206. The intake air cutoff valve 232 is a butterfly valve and is driven by a diaphragm type actuator 233. Further the branch intake passage 212 is provided with a relief passage 234 which bypasses the blower 213. An intake air relief valve 235 is disposed in the relief passage 234.

The actuator 229 which drives the exhaust bypass valve 230 communicates with the branch intake passage 210 at the portion downstream of the blower 211 of the primary turbocharger 204 by way of a pipe 236. The pipe 236 communicates with the branch intake passage 210 at the portion upstream of the blower 211 by way of a pipe 255 in which a duty solenoid valve 256 is disposed. By changing the duty ratio of the duty solenoid valve 256, the pressure introduced from the branch intake passage 210 downstream of the blower 211 is changed and the pressure applied to the actuator 229 is changed, whereby the opening degree of the exhaust bypass valve 230, is changed. When the actuator 229 opens the exhaust bypass valve 230, a small amount of exhaust gas is fed to the turbine 207 of the secondary turbocharger 206 through the exhaust bypass passage 228 while the exhaust cutoff valve 223 is still in the closed state. Accordingly, the secondary turbocharger 206 begins to rotate before the exhaust cutoff valve 223 is opened.

The actuator 233 for driving the intake air cutoff valve 232 has a pressure chamber which is connected to the output port of a three-way solenoid valve 238 by way of a pipe 237. The actuator 231 for driving the exhaust cutoff valve 223 has a pressure chamber which is connected to the output port of another three-way solenoid valve 240 by way of a pipe 239. Further, the actuator 241 for driving the intake air relief valve 235 has a pressure chamber which is connected to the output port of a still another three-way solenoid valve 243 by way of a pipe 242. The intake air relief valve 235 keeps the relief passage 234 open until a predetermined time before the exhaust cutoff valve 223 and intake air cutoff valve 232 are opened, whereby air is circulated to the blower 213 of the secondary turbocharger 206, thereby cooling the blower 213, and the pressure upstream of the intake air cutoff valve 232 is prevented from increasing into the surging range when the secondary turbocharger 206 is pre-rotated by the exhaust gas flowing through the exhaust bypass passage 228.

Further, the actuator 226 for driving the waste gate valve 227 is connected to the output port of a still another three-way solenoid valve 245 by way of a pipe 244.

The three-way solenoid valves 238, 240, 243 and 245, the duty solenoid valve 256 and the fuel injection valves 219 and 220 are controlled by a control unit 246 comprising a microcomputer. Output signals of an engine speed sensor and the airflow meter 221 are input into the control unit 246. Further signals representing the throttle opening, the supercharging pressure P1 downstream of the blower 211 of the primary turbocharger 204 and the like are input into the control unit 246.

One input port of the three-way solenoid valve 238 for the intake air cutoff valve 232 is connected to a negative pressure reservoir 248 by way of a pipe 247, and the other input port is connected to an output port 270 of a differential pressure detecting valve 250 (to be described later) by way of a pipe 249. Negative pressure downstream of the throttle valve 216 is introduced into the negative pressure reservoir 248 by way of a check valve 251. One input port of the three-way solenoid valve 240 for the exhaust cutoff valve 223 opens to the atmosphere and the other input port is connected to the negative pressure reservoir 248 by way of a pipe 252 and the pipe 247. One input port of the three-way solenoid valve 243 for the intake air relief valve 235 is connected to the negative pressure reservoir 248 and the other intake port opens to the atmosphere. One input port of the three-way solenoid valve 245 for the waste gate valve 227 opens to the atmosphere and the other input port is connected to the pipe 236 by way of a pipe 254. By duty control of the duty solenoid valve 256, the opening of the waste gate valve 227 and the exhaust bypass valve 230 can be changed, and the waste gate valve 227 and the exhaust bypass valve 230 function as said supercharging pressure regulating means.

Figure 2:
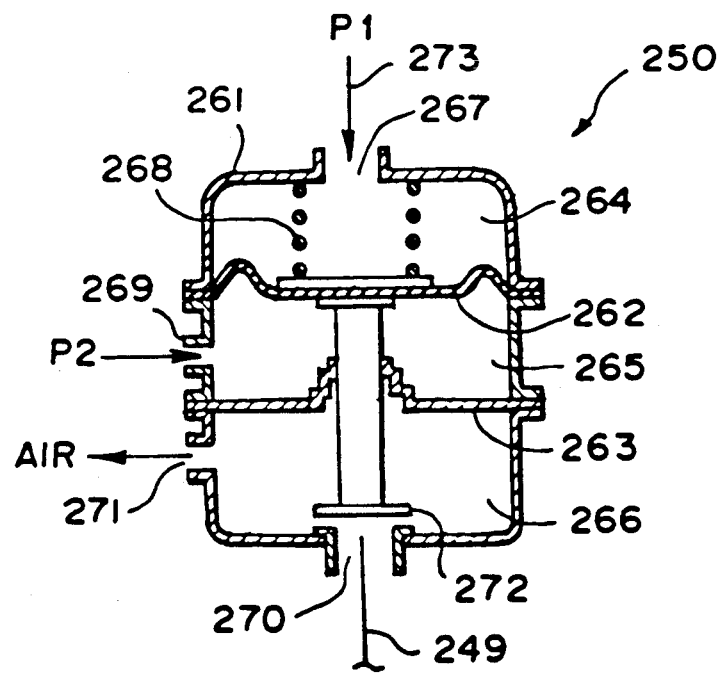
FIG. 2 is a cross-sectional view of the differential pressure detecting valve.

As shown in FIG. 2, the differential pressure detecting valve 250 has a casing 261 and the inner space of the casing 261 is divided into first to third chambers 264, 265 and 266 by first and second diaphragms 262 and 263. The first chamber 264 is provided with a first input port 267, and a compression spring 268 is disposed between the diaphragm 262 and the inner end face of the casing 261. The second or the middle chamber 265 is provided with a second input port 269. The third chamber 266 is provided with an output port 270 at the center of the end wall of the casing 261 and with a port which opens to the atmosphere at the side wall of the casing 261. A valve body 272 is fixed to the first diaphragm 262 at one end and extends through the second diaphragm 263 toward the output port 270.

As shown in FIG. 2, the first input port 267 is connected to a portion downstream of the intake air cutoff valve 232 by way of a pipe 273 and the supercharging pressure P1 downstream of the blower 211 of the primary turbocharger 204 is applied to the first chamber 264. The second intake port 269 is connected to a portion upstream of the intake air cutoff valve 232 by way of a pipe 274, and the pressure P2 upstream of the intake air cutoff valve 232 when the intake air cutoff valve 232 is closed is applied to the second chamber 265. When the difference between the pressure P1 and P2 (P2−P1) becomes not smaller than a predetermined value, the valve body 272 is moved away from the output port 270 to open it. The output port 270 is connected to said the other input port of the three-way solenoid valve 238 for the intake air cutoff valve 232 by way of the pipe 249. Accordingly when the pressure P2 upstream of the intake air cutoff valve 232, i.e., the supercharging pressure of the secondary turbocharger 206 increases to approach the supercharging pressure P1 of the primary turbocharger 204 and to exceed the supercharging pressure P1 by a predetermined value (the pressure difference P2−P1 becomes larger than a predetermined value) with the three-way solenoid valve 238 being on and the pipe 237 which leads to the pressure chamber of the actuator 233 for the intake air cutoff valve 232 being in communication with the pipe 249 which leads to the output port of the differential pressure detecting valve 250, the pressure chamber of the actuator 233 is communicated with the atmosphere and the intake air cutoff valve 232 is opened. On the other hand, when the three-way solenoid valve 238 is turned off and the pipe 237 is communicated with the pipe 247 which leads to the negative pressure reservoir 248, negative pressure is applied to the pressure chamber of the actuator 233 and the intake air cutoff valve 232 is closed.

When the three-way solenoid valve 240 is turned off and the pipe 239 which leads to the pressure chamber of the actuator 231 is communicated with the pipe 252 which leads to the negative pressure reservoir 248, negative pressure is applied to the actuator 231 and the exhaust cutoff valve 223 is closed. When the three-way solenoid valve 240 is turned on and the pipe 239 is opened to the atmosphere, the exhaust cutoff valve 223 is opened and the secondary turbocharger 206 begins to operate.

When the three-way solenoid valve 243 is turned off and the pipe 242 which leads to the pressure chamber of the actuator 241 is communicated with the negative pressure reservoir 248, negative pressure is applied to the actuator 241 and the intake air relief valve 235 is opened. When the three-way solenoid valve 243 is turned on and the pipe 242 is opened to the atmosphere, the intake air relief valve 235 is closed.

While the three-way solenoid valve 245 is on, the actuator 226 for the waste gate valve 227 communicates with the downstream of the blower 211 of the primary turbocharger 204 by way of the pipes 254 and 236, and when the three-way solenoid valve 245 is turned off, the actuator 226 is opened to the atmosphere and.

In this particular embodiment, each of the exhaust cutoff valve 223, the intake air cutoff valve 232 and the intake air relief valve 235 is opened and closed with hysteresis, as will become apparent later. Further, in order to prevent reverse flow of intake air to the blower 213 of the secondary turbocharger 206 in the case the exhaust cutoff valve 223 is kept closed and the intake air cutoff valve 232 is kept open when the operating condition of the engine shifts from the large intake air mass range to the small intake air mass range, the intake air cutoff valve 232 is forced to close a predetermined time (e.g., two seconds) after the exhaust cutoff valve 223 is closed.

Figure 3:
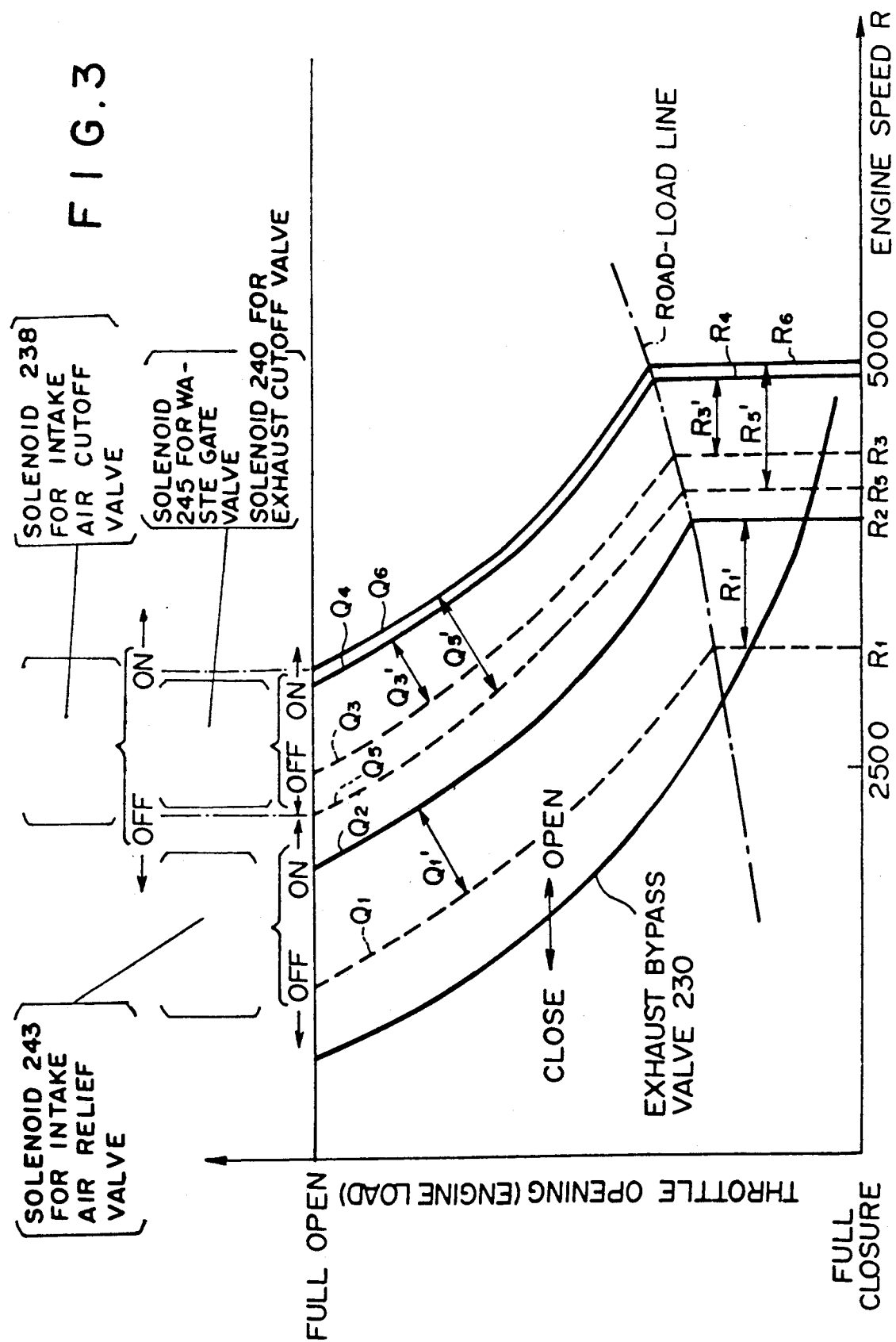
FIG. 3 is a map showing the operating range of the exhaust cutoff valve, the intake air cutoff valve, the intake air relief valve, the waste gate valve and the exhaust bypass valve.

The control unit 246 controls the three-way solenoid valves 238, 240, 243 and 245 to selectively open and close the intake air cutoff valve 232, exhaust cutoff valve 223, intake air relief valve 235 and waste gate valve 227 according to the map shown in FIG. 3. The map is stored in the control unit 246.

When the operating condition of the engine shifts from the small intake air mass range to the large intake air mass range, the intake air relief valve 235 is open in the range where the engine speed R is low or the intake air mass flow Q is small, and the secondary turbocharger 206 is pre-rotated by opening of the exhaust bypass valve 230. When the engine speed R increases to the value R2 or the intake air mass flow Q reaches Q2-R2 line the three-way solenoid valve 243 is turned on and the intake air relief valve 235 is closed. When the engine speed R increases to the value R4 or the intake air mass flow Q reaches Q4-R4 line, the three-way solenoid valve 240 is turned on and the exhaust cutoff valve 223 is opened. Further, when the engine speed R increases to the value R6 or the intake air mass flow Q reaches Q6-R6 line, the three-way solenoid valve 238 is turned on and the intake air cutoff valve 232 is opened, whereby the secondary turbocharger 206 begins to operate. That is, when the operating condition of the engine shifts across the Q6 R6 line, both the primary and secondary turbochargers 204 and 206 operate to supercharge the engine.

The actuator 233 for driving the intake air cutoff valve 232 is not only governed by the three-way solenoid valve 238. That is, since the atmospheric pressure which causes the intake air cutoff valve 232 to open is fed to the actuator 233 by way of the differential pressure detecting valve 250, the intake air cutoff valve 232 actually opens a certain time after the three-way solenoid valve 238 is turned on. Accordingly, the Q6-R6 for shifting the three-way solenoid valve 238 for the intake air cutoff valve 232 from the off state to the on state is set taking into account the delay due to the differential pressure detecting valve 250, and as a result, the Q6-R6 line is set near the Q4-R4 line for shifting the three-way solenoid valve 240 for the exhaust cutoff valve 223 from the off state to the on state. The Q6-R6 line may be conformed to the Q4-R4 line.

When the operating condition of the engine shifts from the large intake air mass range to the small intake air mass range, the intake air cutoff valve 232, the exhaust cutoff valve 223 and the intake air relief valve 235 are switched when the operating condition of the engine shifts across Q5-R5 line, Q3-R3 line and Q1-R1 line shown by the broken line FIG. 3. That is, when the engine speed R decreases to the value R3 or the intake air mass flow Q decreases to the Q3-R3 line, the exhaust cutoff valve 223 is closed. Further, when the operating condition of the engine shifts into the small intake air mass range and the engine speed R decreases to the value R5 or the intake air mass flow Q decreases to the Q5-R5 line, the intake air cutoff valve 232 is closed. Then the intake air relief valve 235 is opened a certain time after the closure of the intake air cutoff valve 232. By closing the intake air cutoff valve 232 after a delay from the closure of the exhaust cutoff valve 223, occurrence of surging can be prevented when the operating condition of the engine shifts into the small intake air mass range.

In this embodiment, the three-way solenoid valve 245 for the waste gate valve 227 is turned on and off according to the same lines as for the three-way solenoid valve 240 for the exhaust cutoff valve 223. When the operating condition of the engine shifts from the small intake air mass range to the large intake air mass range, the three-way solenoid valve 245 is turned on when the engine speed R increases to the value R4 or the intake air mass flow Q increases to the Q4-R4 line, and when the operating condition of the engine shifts from the large intake air mass range to the small intake air mass range, the three-way solenoid valve 245 is turned off when the engine speed R decreases to the value R3 or the intake air mass flow Q decreases to the Q3-R3 line. In FIG. 3, the point at which each line is folded is on a so-called no-load line or road-load line.

In this embodiment, in the small intake air mass range, exhaust gas is not fed to the secondary turbocharger 206 and only the primary turbocharger 204 operates. Accordingly high supercharging pressure can be quickly obtained. In the large intake air mass range, both the primary and secondary turbochargers 204 and 206 operate and sufficient intake air mass flow and proper supercharging pressure can be obtained.

Figure 4:
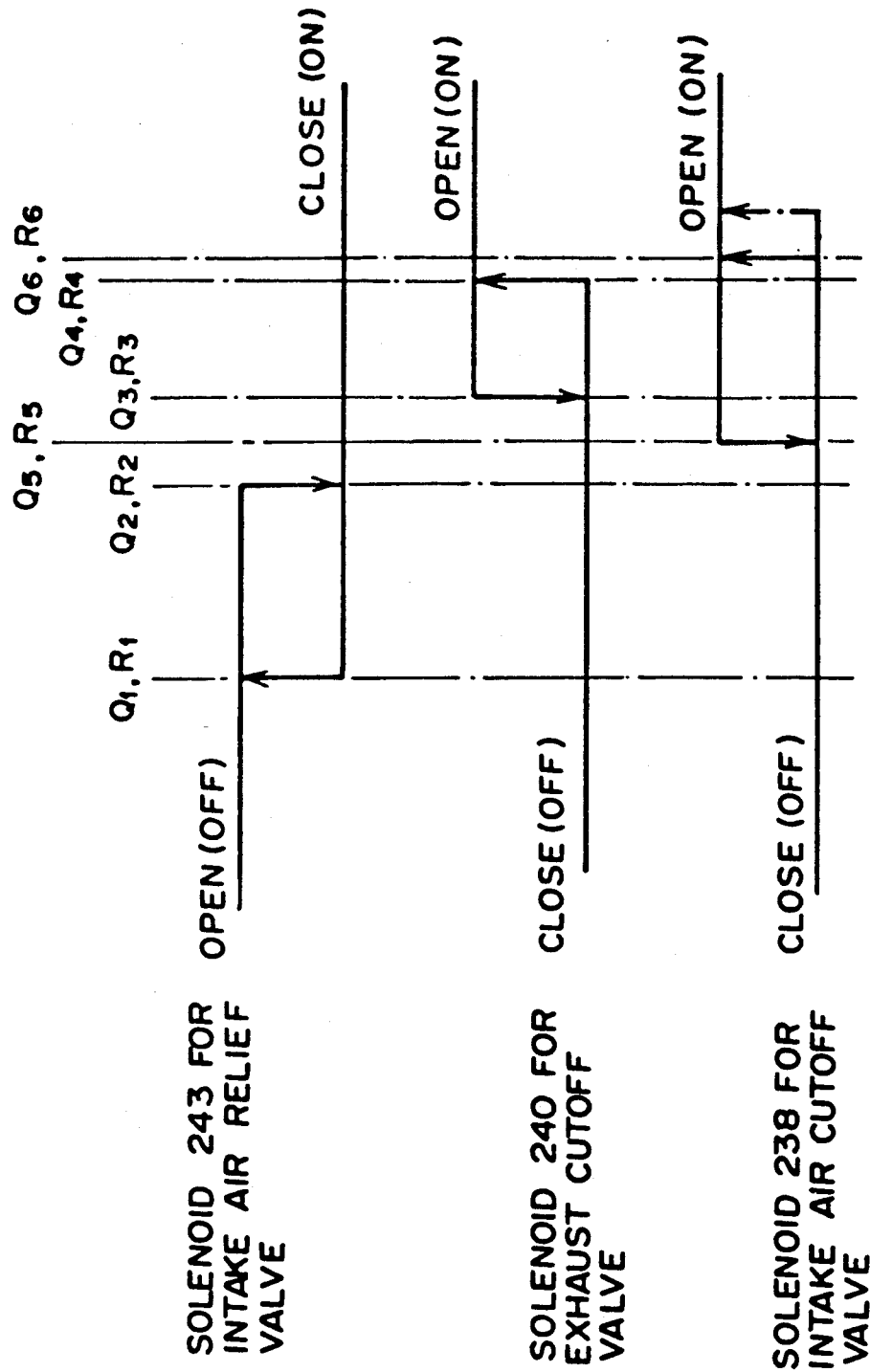
FIG. 4 shows the timing the intake air cutoff valve, the exhaust cutoff valve and the intake air relief valve are opened and closed.

FIG. 4 shows the relation between the operating condition of the engine and on and off of the three-way solenoid valves. As can be seen from FIG. 4, the hysteresis of opening and closure of the exhaust cutoff valve 223 is entirely included in the hysteresis of opening and closure of the intake air cutoff valve 232. Due to the differential pressure detecting valve 250, the intake air cutoff valve 232 is actually opened, as shown by the broken line, after a delay from the time the intake air cutoff valve 232 is turned on when the operating condition of the engine reaches the Q6-R6 line. Accordingly, the Q6-R6 line is set near the Q4-R4 line or is conformed to the Q4-R4 line. On the other hand, the intake air cutoff valve 232 is closed upon turning off the three-way solenoid valve 238 without such a delay. Accordingly, the values of Q5 and R5 should be Q5<Q3 and R5<R3.

Figure 5:
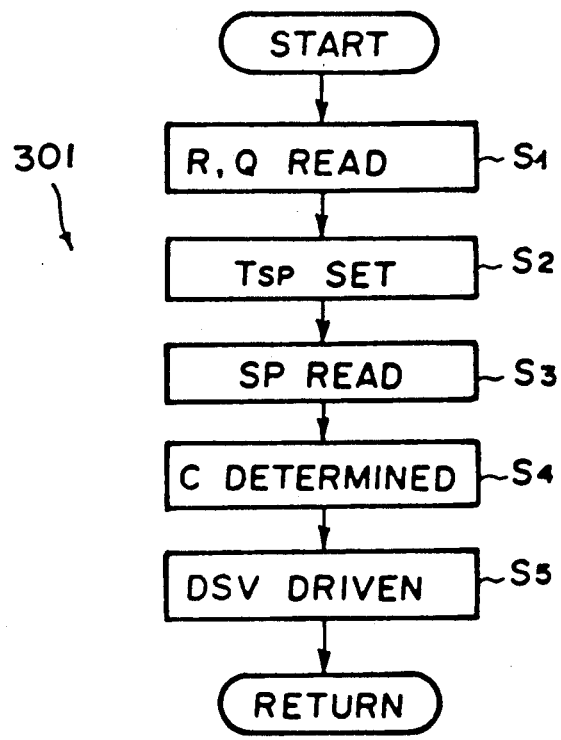
FIG. 5 is a flow chart showing an example of the control of the supercharging pressure which the control unit executes.

FIG. 5 is a flow chart showing an example of the control of the supercharging pressure which the control unit 246 executes. The control unit 246 first reads the engine speed R, the intake air mass flow Q and the like to know the operating condition of the engine (step S1). Then in step S2, the control unit 246 determines a target supercharging pressure $T_{SP}$ on the basis of the data read in step S1 according to the map shown in FIG. 6. The control unit 246 reads the actual supercharging pressure SP as detected by the supercharging pressure sensor 257 and determines a correction value C on the basis of the difference between the actual supercharging pressure and the target supercharging pressure (steps S3 and S4). Then in step S5, the control unit 246 outputs the correction value and drives the duty solenoid valve (DSV) 256. Thus the opening of the waste gate valve 227 and the exhaust bypass valve 230 is controlled so that the actual supercharging pressure approximates to the target supercharging pressure.

Figure 6:
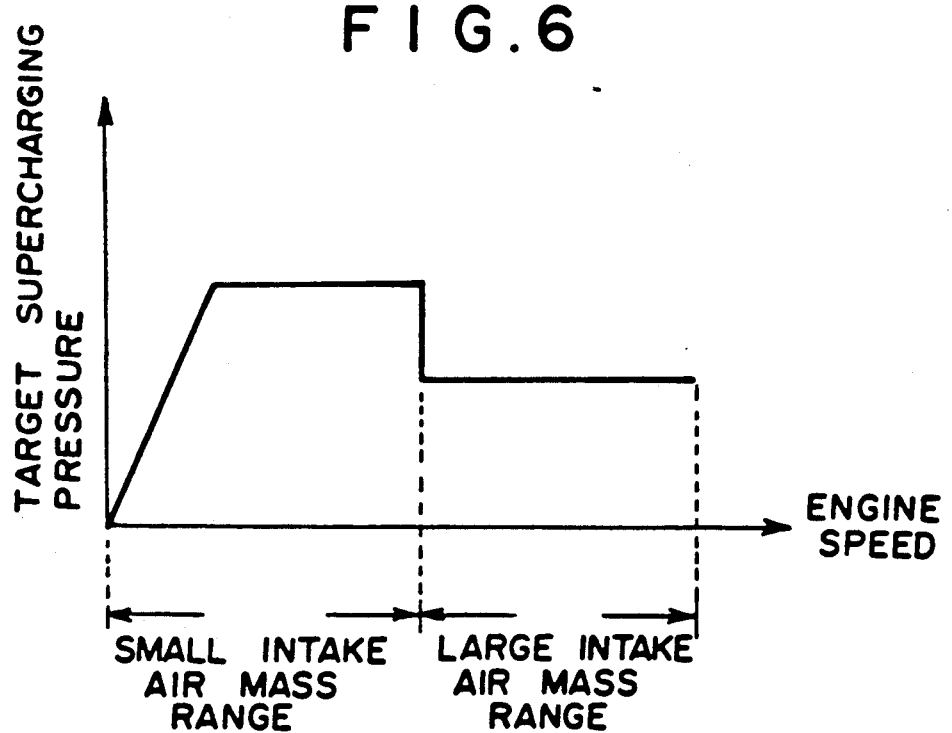
FIG. 6 is a view showing the target supercharging pressure.

As can be seen from FIG. 6, the target supercharging pressure in the large intake air mass range where both the primary and secondary turbochargers operate is set lower than that in the small intake air mass range where only the primary turbocharger operates. Accordingly, when the operating condition of the engine shifts into the large intake air mass range from the small intake air mass range and the secondary turbocharger 206 begins to operate, which results in reduction of the exhaust pressure upstream of the turbines, the target supercharging pressure is lowered and an abrupt increase of the engine output torque is prevented, whereby torque shock is suppressed.

Further when the operating condition of the engine shifts into the small intake air mass range from the large intake air mass range and the secondary turbocharger 206 is made inoperative, which results in increase of the exhaust pressure upstream of the turbines, the target supercharging pressure is increased and an abrupt drop of the engine output torque is prevented, whereby torque shock is suppressed.

FIG. 7 shows a control circuit for controlling the valves. The three-way solenoid valve 243 for the intake air relief valve 235 is controlled by the output of a first OR circuit 121 in which the outputs of first and second comparators 111 and 112 are input. The first comparator 111 compares the intake air mass flow Q represented by the detecting signal of the airflow meter 221 with a reference value which is the output of a first adder 131.

Into the first adder 131 is input a preset value Q1 which corresponds to an intake air mass flow on the Q1-R1 line in FIG. 3. Further a value Q'1 ($Q1+Q'1=Q2$) is input into the first adder 131 by way of a first gate 141. When the first gate 141 is opened, the first adder 131 outputs a value Q2 ($Q1+Q'1=Q2$) to the first comparator 111 as the reference value. On the other hand, when the first gate 141 is closed, the first adder 131 outputs the value Q1 to the first comparator 111 as the reference value. The first gate 141 is opened and closed by the output of the first OR circuit 121.

The second comparator 112 compares the engine speed R represented by the detecting signal of the engine speed sensor with a reference value which is the output of a second adder 132. Into the second adder 132 is input a preset value R1 which corresponds to an engine speed on the Q1-R1 line in FIG. 3. Further a value R'1 ($R1+R'1=R2$) is input into the second adder 132 by way of a second gate 142. When the second gate 142 is opened, the second adder 132 outputs a value R2 ($R1+R'1=R2$) to the second comparator 112 as the reference value. On the other hand, when the second gate 142 is closed, the second adder 132 outputs the value R1 to the second comparator 112 as the reference value. The second gate 142 is also opened and closed by the output of the first OR circuit 121.

The first and second comparators 111 and 112 compares the intake air mass flow Q and the engine speed R with the respective reference values which are the outputs of the first and second adders 131 and 132, and the first OR circuit 121 outputs an ON-signal to the three-way solenoid valve 243 to turn on it, thereby closing the intake air relief valve 235, when the intake air mass flow Q or the engine speed R becomes not smaller than the reference value. The first and second gates 141 and 142 are kept closed while the output of the first OR circuit 121 is the ON-signal and are kept open while the output of the first OR circuit 121 is the OFF-signal. Accordingly, when the operating condition of the engine shifts from the small intake air mass range to the large intake air mass range and the output of the first OR circuit 121 is the OFF-signal, the first and second gates 141 and 142 are open and the values Q2 and R2 are input into the respective first and second comparators 111 and 112 as the reference values. Thus when the operating condition reaches the Q2-R2 line FIG. 3, the ON-signal is output and the intake air relief valve 235 is opened. The ON-signal causes the first and second gates 141 and 142 to close and the values Q1 and R1 are input into the respective comparators 111 and 112 as the reference values. In this manner, the line Q1-R1 for the shift of the operating condition of the engine in the reverse direction is set with a hysteresis corresponding to the values Q'1 and R'1.

The three-way solenoid valve 240 for the exhaust cutoff valve 223 is controlled by the similar circuit. That is, a third comparator 113 is provided for the intake air mass flow Q and a fourth comparator 114 is provided for the engine speed R, and the outputs of the comparators 113 and 114 are connected to the three-way solenoid valve 240 by way of a second OR circuit 122. The third comparator 113 is provided with a third adder 133 and the fourth comparator 114 is provided with a fourth adder 134. A preset value Q3 is input into the third comparator 133 and a value Q'3 ($Q3+Q'3=Q4$) is input into the third comparator 113 by way of a third gate 143. Similarly, a preset value R3 is input into the fourth comparator 134 and a value R'3 ($R3+R'3=R4$) is input into the fourth comparator 114 by way of a fourth gate 144. This circuit operates in the similar manner to that for the three-way solenoid valve 243 for the intake air relief valve 235, and the exhaust cutoff valve 223 is opened when the operating condition of the engine shifts across the Q4-R4 line to the large intake air mass range and is closed when the operating condition of the engine shifts across the Q3-R3 line to the small intake air mass range. The three-way solenoid valve 245 for the waste gate valve 227 is controlled by the same signal.

Similarly the three-way solenoid valve 238 for the intake air cutoff valve 232 is controlled by a circuit which comprises fifth and sixth comparators 115 and 116, a third OR circuit 123, fifth and sixth adders 135 and 136, and fifth and sixth gates 145 and 146 and operates substantially in the same manner as the circuits for the three-way solenoid valves 243 and 240. By this circuit, the intake air cutoff valve 232 is opened when the operating condition of the engine shifts across the Q6-R6 line to the large intake air mass range and is closed when the operating condition of the engine shifts across the Q5-R5 line to the small intake air mass range, wherein $Q6=Q5+Q'5$ and $R6=R5+R'5$.

In the case of the circuit for controlling the intake air cutoff valve 232, a seventh gate 147 is interposed between the third OR circuit 123 and the three-way solenoid valve 238. A timer 150 begins to count up at the time the output of the second OR circuit 122 (for the exhaust cutoff valve 223) changes from the ON-signal to the OFF-signal, and a seventh comparator 117 outputs an ON-signal when the count of the timer 150 exceeds a preset value (e.g., the value corresponding to 2 seconds). When the seventh comparator 117 outputs the ON-signal, the seventh gate 147 is closed and the intake air cutoff valve 232 is closed. At the same time, the reference values for the intake air mass flow Q and the engine speed R are changed to the values Q6 and R6 and the timer 150 is reset. Though the output of the seventh comparator 117 turns into the OFF-signal when the seventh gate 147 is once closed, the intake air cutoff valve 232 is kept closed because the reference values have changed to Q6 and R6. With this arrangement, surging which can occur when the three-way solenoid valve 240 for the intake air cutoff valve 232 is kept on for a long time with the three-way solenoid valve 238 for the exhaust cutoff valve 223 being off during shift of the operating condition of the engine into the small intake air mass range is prevented.

Though in the flow chart shown in FIG. 5, whether the operating condition of the engine is in the small intake air mass range or the large intake air mass range is detected on the basis of the engine speed R and the intake air mass flow Q, it may be detected on the basis of whether the three-way solenoid valve 238 for the intake air cutoff valve 232 or the three-way solenoid valve 240 for the exhaust cutoff valve 223 is on or off as shown in FIG. 8. That is, the control unit 246 first determines in step S10 whether the three-way solenoid valve 238 for the intake air cutoff valve (ICV) 232 or the three-way solenoid valve 240 for the exhaust cutoff valve 223 is on or off. When it is determined that the three-way solenoid valve 238 or 240 is on, the control unit 246 sets the target supercharging pressure $T_{SP}$ to a preset value $T_{SP2}$ which corresponds to the target supercharging pressure for the large intake air mass range shown in FIG. 6. (step S11) Otherwise the control unit 246 sets the target supercharging pressure $T_{SP}$ to a value $T_{SP2}$ which is determined according to the target supercharging pressure-engine speed characteristic line for the small intake air mass range shown in FIG. 6. After the target supercharging pressure $T_{SP}$ is thus determined in step S11 or S12, the control unit 246, the control unit 246 reads the actual supercharging pressure SP as detected by the supercharging pressure sensor 257 and determines a correction value C on the basis of the difference between the actual supercharging pressure SP and the target supercharging pressure $T_{SP}$. (steps S13 and S14) Then in step S15, the control unit 246 outputs the correction value and drives the duty solenoid valve (DSV) 256. Thus the opening of the waste gate valve 227 and the exhaust bypass valve 230 is controlled so that the actual supercharging pressure approximates to the target supercharging pressure.

The target supercharging pressure for the small intake air mass range may be corrected according to various factors which affect the operating condition of the engine. For example, it may be lowered as the temperature of intake air increases, or as the frequency of engine knock increases, or as the frequency of misfire increases. Further it may be increased as the octane number of fuel increases.

Though, in the embodiment described above, the present invention is applied to a rotary engine, the present invention can be applied to any other engine such as a reciprocating engine.

We claim:

1. A supercharging pressure control system for an engine provided with a primary turbocharger and a secondary turbocharger having blowers disposed in the intake passage of the engine in parallel to each other and turbines disposed in the exhaust passage of the engine in parallel to each other, an air flow detecting means for detecting air flow into the engine, a control means for causing only the primary turbocharger to operate in an intake air mass range detected by the air flow detecting means smaller than a predetermined air mass flow and causing both the primary and secondary turbochargers to operate in an intake air mass range detected by the air flow detecting means larger than the predetermined air mass flow, said supercharging pressure control system comprising:
   a supercharging pressure regulating means for regulating the supercharging pressure;
   a supercharging pressure detecting means for detecting the supercharging pressure; and
   a supercharging pressure control means for receiving an output of the supercharging pressure detecting means and for controlling the supercharging pressure regulating means so that the supercharging pressure approximates to a target supercharging pressure, and for controlling the target supercharging pressure being set in synchronization with a function of the control mean when the air mass range detected by the air flow detecting means moves from the small range into the large range.

2. A supercharging pressure control system as defined in claim 1, in which said target supercharging pressure is set as a function of the engine speed.

3. A supercharging pressure control system as defined in claim 2, in which the target supercharging pressure is switched between those for the small intake air mass range and for the large intake air mass range at a predetermined engine speed.

4. A supercharging pressure control system as defined in claim 3 in which said target supercharging pressure for a given engine speed is changed according to the engine load.

5. A supercharging pressure control system as defined in claim 1 in which said target supercharging pressure is changed in accordance with conditions which affect the operating condition of the engine.

6. A supercharging pressure control system as defined in claim 5 in which said target supercharging pressure is lowered as the temperature of intake air increases.

7. A supercharging pressure control system as defined in claim 5 in which said target supercharging pressure is lowered as the frequency of engine knock increases.

8. A supercharging pressure control system as defined in claim 5 in which said target supercharging pressure is lowered as the frequency of misfire increases.

9. A supercharging pressure control system as defined in claim 5 in which said target supercharging pressure is increased as the octane number of fuel increases.

10. A supercharging pressure control system for an engine provided with a primary turbocharger and a secondary turbocharger having blowers disposed in the intake passage o he engine in parallel to each other and turbines disposed in the exhaust passage f the engine in parallel to each other, an air flow detecting means for detecting air flow into the engine, a control means for casing only the primary turbocharger to operate in an intake air mass range detected by the air flow detecting means smaller than a predetermined air mass flow and causing both the primary and secondary turbochargers to operate in an intake air mass range detected by the air flow detecting means larger than the predetermined air mass flow, said supercharging pressure control system comprising:
   a supercharging pressure regulating means for regulating the supercharging pressure;
   a supercharging pressure detecting means for detecting the supercharging pressure;
   a supercharging pressure control means for receiving an output of the supercharging pressure detecting means and for controlling the supercharging pressure regulating means so that the supercharging pressure approximates to a target supercharging pressure, and for controlling the target supercharging pressure being set in synchronization with a function of the control means when the air mass range detected by the air flow detecting means moves from the small range into the large range; and
   an intake air cutoff valve provided in the intake passage upstream of the secondary turbocharger for closing the intake passage in the intake air mass range smaller than the predetermined intake air mass flow and to open the same in the intake air mass larger than the predetermined intake air mass flow, and the target supercharging pressure is switched between those for the small intake air mass range and for the large intake air mass range in synchronization with opening and closing of the intake air cutoff valve.

11. A supercharging pressure control system for an engine provided with a primary turbocharger and a secondary turbocharger having blowers disposed in the intake passage of he engine in parallel to each other and turbines disposed int he exhaust passage of the engine in parallel to each other, an air flow detecting means for detecting air flow into the engine, a control means for causing only the primary turbocharger to operate in an intake air mass range detected by the air flow detecting means smaller than a predetermined air mass flow and causing both the primary and secondary turbochargers to operate in an intake air mass range detected by the air flow detecting means larger than the predetermined air mass flow, said supercharging pressure control system comprising:

- a supercharging pressure regulating means for regulating the supercharging pressure;
- a supercharging pressure detecting means for detecting the supercharging pressure;
- a supercharging pressure control means for receiving an output of the supercharging pressure detecting means and for controlling the supercharging pressure regulating means so that the supercharging pressure approximates to a target supercharging pressure, and for controlling the target supercharging pressure being set in synchronization with a function of the control mans when the air mass range detected by the air flow detecting means moves from the small range into the large range; and
- an exhaust cutoff valve disposed in the exhaust passage which opens to feed exhaust gas to the turbine of the secondary turbocharger to operate the secondary turbocharger only in the intake air mass range larger than the predetermined intake air mass inflow, and the target supercharging pressurize is switched between those for the small intake air mass range and for the large intake air mass range in synchronization with opening and closing of the exhaust cutoff valve.

12. A supercharging pressure control system as defined in claim 11 in which said exhaust cutoff valve opens to feed exhaust gas to the turbine of the secondary turbocharger to operate the secondary turbocharger at as first predetermined intake air mass flow when the operating condition of the engine shifts from the small intake air mass range to the large intake air mass range and closes to cut exhaust as to the blower of the secondary turbocharger at a second predetermined intake air mass flow when the operating condition of the engine shifts from the large intake air mass range to the small intake air mass range, the second intake air mass flow being smaller than the first predetermined intake air mass flow.

13. A supercharging pressure control system as defined in claim 12 in which an intake air cutoff valve is provided in the intake passage upstream of the secondary turbocharger, the intake air cutoff valve opening at a third predetermined intake air mass flow when the operating condition of the engine shifts from the small intake air mass range to the small intake air mass range and closing at a fourth predetermined intake air mass flow when the operating condition of the engine shifts from the large intake air mass range to the small intake air mass range, the third predetermined intake air mass flow being larger than the fourth predetermined intake air mass flow but smaller than the first predetermined intake air mass flow and the fourth predetermined intake air mass flow being larger than the second predetermined intake air mass flow.

* * * * *